(12) United States Patent
Schnackenberg et al.

(10) Patent No.: US 8,185,944 B2
(45) Date of Patent: May 22, 2012

(54) HIGH-ASSURANCE FILE-DRIVEN CONTENT FILTERING FOR SECURE NETWORK SERVER

(75) Inventors: Daniel D. Schnackenberg, Auburn, WA (US); Janell Schnackenberg, legal representative, Auburn, WA (US); Kelly S. Bunn, Duvall, WA (US); Thomas E. Donofrio, Federal Way, WA (US); Steven L. Arnold, Kirkland, WA (US); Travis S. Reid, Seattle, WA (US); Ryan D. Hammond, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 948 days.

(21) Appl. No.: 11/365,043

(22) Filed: Feb. 28, 2006

(65) Prior Publication Data

US 2007/0204337 A1   Aug. 30, 2007

(51) Int. Cl.
    *H04L 29/06* (2006.01)
(52) U.S. Cl. ............... 726/12; 726/11; 726/13; 726/22; 713/151; 713/153; 713/154; 713/164; 713/166
(58) Field of Classification Search .................. 726/11, 726/12, 13, 14, 26, 22; 713/153, 154, 151, 713/152; 707/E17.059
    See application file for complete search history.

(56) References Cited

U.S. PATENT DOCUMENTS

| | | | | |
|---|---|---|---|---|
| 5,734,903 A * | 3/1998 | Saulpaugh et al. | ............ | 719/316 |
| 5,835,722 A * | 11/1998 | Bradshaw et al. | ............ | 709/225 |
| 6,094,684 A * | 7/2000 | Pallmann | .................. | 709/227 |
| 6,272,639 B1 * | 8/2001 | Holden et al. | .................. | 726/12 |
| 6,289,462 B1 * | 9/2001 | McNabb et al. | ................ | 726/21 |
| 6,584,508 B1 * | 6/2003 | Epstein et al. | ................ | 709/229 |
| 6,604,143 B1 | 8/2003 | Nagar et al. | | |
| 6,700,891 B1 * | 3/2004 | Wong | ............................ | 370/401 |
| 6,772,214 B1 * | 8/2004 | McClain et al. | ............... | 709/229 |
| 7,131,141 B1 * | 10/2006 | Blewett et al. | .................. | 726/12 |
| 7,840,573 B2 * | 11/2010 | Adams et al. | ................... | 707/752 |
| 2002/0073313 A1 * | 6/2002 | Brown et al. | ................. | 713/165 |
| 2003/0120949 A1 * | 6/2003 | Redlich et al. | ................ | 713/200 |
| 2004/0111639 A1 * | 6/2004 | Schwartz et al. | ............. | 713/201 |
| 2005/0027723 A1 * | 2/2005 | Jones et al. | .................. | 707/100 |
| 2005/0033990 A1 * | 2/2005 | Harvey et al. | ................. | 713/201 |
| 2006/0007466 A1 * | 1/2006 | Ben-Yehuda et al. | ........ | 358/1.13 |
| 2006/0143449 A1 * | 6/2006 | Groger et al. | ................. | 713/166 |
| 2006/0236234 A1 * | 10/2006 | Michelstein et al. | ......... | 715/523 |
| 2006/0259977 A1 * | 11/2006 | Patrick | ............................ | 726/26 |
| 2006/0265689 A1 * | 11/2006 | Kuznetsov et al. | ........... | 717/117 |

(Continued)

OTHER PUBLICATIONS

Swarup, "Automatic Generation of High Assurance Security Guard Filters", 1994, in Proceedings of the 17th National Computer Security Conference, Baltimore, Oct. 1994.*

(Continued)

*Primary Examiner* — Eleni Shiferaw
*Assistant Examiner* — Hilary Branske
(74) *Attorney, Agent, or Firm* — Ostrager Chong Flaherty & Broitman P.C.

(57) ABSTRACT

A server for transferring data between networks. The server is programmed to perform the following steps: (a) creating a receiving process, a filtering process and a forwarding process, the filtering process being dictated by a file that specifies filtering rules, wherein: (b) the receiving process receives data transmitted from a source host; (c) the filtering process filters the transmitted data based on the filtering rules; and (d) the forwarding process forwards only filtered data to a destination host.

8 Claims, 15 Drawing Sheets

U.S. PATENT DOCUMENTS

2007/0300306 A1* 12/2007 Hussain ............... 726/27
2010/0192217 A1* 7/2010 Arnold ............... 726/13

OTHER PUBLICATIONS

Epstein, "Architecture and concepts of the ARGuE Guard," Computer Security Applications Conference, 1999. (ACSAC '99) Proceedings. 15th Annual, vol., No., pp. 45-54, 1999).*

Epstein, J., "Architecture and concepts of ARGuE Guard." Comp. Security Applns. Conf., 1999, 15th Annual Proc., pp. 45-54.

Smith, R.E., "A Secure Email Gateway (Building an RCAS External Interface)," Comp. Security Applns. Conf., 1994, 10th Annual Proc., pp. 202-211.

Galik, D., et al., "Fielding Multilevel Security into Command and Control Systems," Comp. Security Applns. Conf., 1991, Seventh Annual Proc., pp. 202-208.

IETF CIPSO Working Group, "Commercial IP Security Option (CIPSO 2.2)," IETF Standard—Working Draft, 1992, pp. 1-12.

* cited by examiner

HIGH-ASSURANCE FILE-DRIVEN CONTENT FILTERING FOR SECURE NETWORK SERVER

BACKGROUND OF THE INVENTION

This invention relates to systems that provide content filtering between networks operating at different security levels.

Current technology for filtering content between networks operating at different security levels is limited to customized software filters written for each filtering application. These are expensive to develop and maintain because the filtering rules are part of the executable software. In order to change the filtering rules of such customized software filters, one would need to rewrite the executable software.

There is a need for a file-driven approach, particularly one that can be done at high assurance levels, that would make this type of filtering more affordable. The term commonly used for systems that provide content filtering between networks operating at different security levels is "cross-domain solutions".

BRIEF DESCRIPTION OF THE INVENTION

The invention solves the foregoing problem by providing a filtering language for describing filtering policies appropriate for cross-domain solutions, plus a high-assurance software implementation that uses this language for enforcement of customer-specific content filtering policies. The filtering language supports common data types, such as extensible markup language (XML), e-mail, and well-formatted binary messages, and is extensible to any well-structured data, such as hyper-text markup language (HTML).

One aspect of the invention is a server for transferring data between networks, the server being programmed to perform the following steps if the transferred data is to be filtered: (a) creating a receiving process, a filtering process and a forwarding process, the filtering process being dictated by a file that specifies filtering rules, wherein: (b) the receiving process receives data transmitted from a source host; (c) the filtering process filters the transmitted data based on the filtering rules; and (d) the forwarding process forwards only filtered data to a destination host.

Another aspect of the invention is a method of filtering data being transferred between networks, comprising the following steps: (a) initiating a connection of a source host to a network server; (b) creating a receiving process, a filtering process and a forwarding process within the network server in response to initiation of the connection, the filtering process being dictated by a file that specifies filtering rules; (c) establishing a connection between the forwarding process and a destination host; (d) establishing a connection between the receiving process and the source host; (e) transmitting data from the source host to the receiving process; (f) the filtering process filters the transmitted data based on the filtering rules; and (g) the forwarding process forwards only filtered data to the destination host.

A further aspect of the invention is a secure network server having trusted security functionality comprising a receiving process and a forwarding process, and non-trusted security functionality comprising a filtering process, the filtering process being dictated by a file that specifies filtering rules, wherein: (a) the receiving process receives data transmitted from a source host; (b) the filtering process filters the transmitted data based on the filtering rules; and (c) the forwarding process forwards only filtered data to a destination host.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
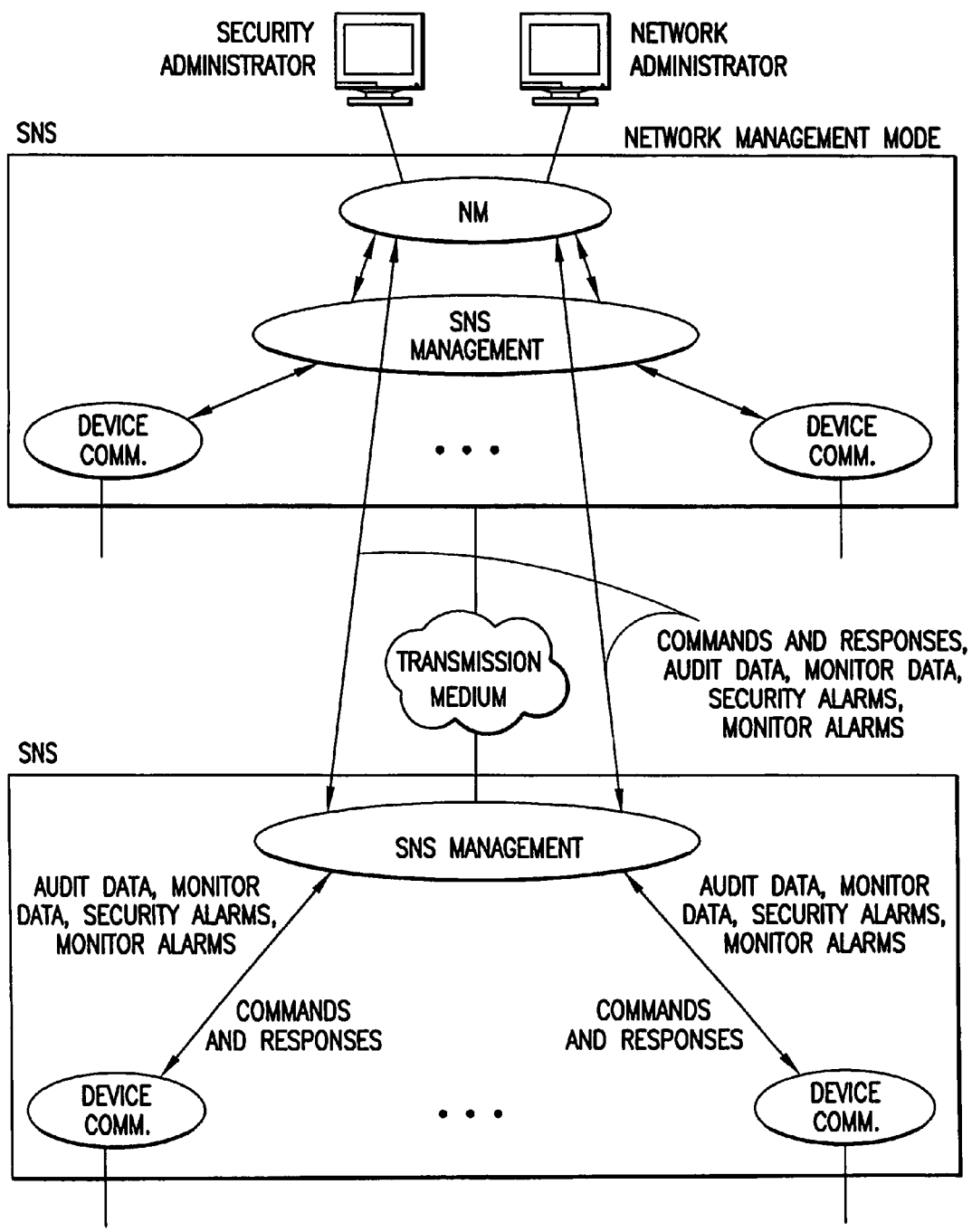
FIG. 1 is a diagram showing the data flow in an SNS system having hierarchical management.

The Secure Network Server (SNS) disclosed herein is a multilevel secure (MLS) Internet Protocol (IP) filtering router, with firewall/guard capabilities, supporting standard protocols, including Transmission Control Protocol (TCP), User Datagram Protocol (UDP), IP Control Message Protocol (ICMP), and Simple Mail Transfer Protocol (SMTP).

The SNS provides users the capability to securely interconnect different security domains. The SNS serves as a filtering router, with the capability to support reliable upgrade, and filtered downgrade of data between security domains. The SNS supports both single-level and multilevel subscriber devices and networks. More specifically, the SNS provides the following subscriber device services: (a) support for unlabeled single-level interfaces through standard IP protocol; (b) support for multilevel interfaces through the Common IP Security Option (CIPSO) labeling standard; (c) IP packet filtering, with filtering rules based on IP protocol, IP source address and mask, IP destination address and mask, TCP/UDP source and destination ports, and ICMP types; (d) routing IP multicast to multiple destinations; (e) e-mail, generic TCP, and simple message transfer protocol proxies, enabling reliable upgrade and filtered downgrade of data; and (f) generic filtering capability for fixed format messages, email and XML messages. Filtering rules are defined in a file downloaded to the SNS.

The SNS's generic filtering capability employs a filtering language for describing filtering policies appropriate for cross-domain solutions, plus a high-assurance software implementation that uses this language for enforcement of customer-specific content filtering policies. The filtering language supports common data types, such as extensible markup language (XML), e-mail, and well-formatted binary messages, and is extensible to any well-structured data, such as hyper-text markup language (HTML). For each content element, the filtering language supports the capabilities to: (1) strip out the content; (2) change the content to a user-specified value; (3) pass through the content without review; or (4) validate the content against rules specific to the content type. The filtering language supports complex, numeric and text content types. Complex types indicate that the content is a collection of other content elements. Numeric types can be filtered either by validating the data against a user-specified range of data or a discrete list of user-specified values. Filtering rules for text data can be specified to be either a discrete list of user-specified values or handled by processing a user-specified "dirty phrase" list. The language enables the user to specify wither deletion of content elements that violate their filtering rules or deletion of the entire age if a content element violates its filtering rule. The filtering language format is an extension of XML. Modifications to this standard format allow specification of filtering rules for named fields, and added structure allows this format to specify rules for message types other than XML.

The SNS provides the following network management (NM) services: (a) control of one or more SNSs through a single network management node; (b) support for "warm spare" approach to fail-over of the network management node; (c) administrative control of SNS security and networking features through a command line interface; (d) review of network audit and monitor trails through the command line interface; (e) real-time streaming of SNS audit data to an attached audit server; (f) separation of duty between security and network administration of the system; and (g) SNS control.

The SNS in accordance with the disclosed embodiment connects to subscriber devices using standard Ethernet operating at 10/100 Mbps, plus Gbps Ethernet. A system of SNSs comprises multiple chasses interconnected through a private inter-SNS trunk (indicated in FIG. 1 by the cloud labeled "TRANSMISSION MEDIUM"). One of the SNSs is designated as the current NM node. Alternate NM nodes can be used, but only one can be active at a time.

At the network layer, the SNS in accordance with the disclosed embodiment supports standard IP and ICMP. The SNS routing mechanisms support both unicast and multicast IP. For multicast IP, the SNS enables users to enter multicast delivery through one or more SNSs to multiple networks or devices.

At the transport level, the SNS in accordance with the disclosed embodiment can route any protocol that resides atop IP. In particular, the SNS provides proxies for TCP-based applications, enabling reliable upgrade and downgrade for these applications. The SNS in accordance with the disclosed embodiment provides three application proxies: SMTP, TCP, and a simple message transfer protocol. All three provide reliable upgrade. The SNS in accordance with the disclosed embodiment also provides content filtering for both upgrade and downgrade of messages. The SMTP proxy enables filtering based on e-mail addresses. Content filters for e-mail, TCP and the simple message transfer protocol are defined using an offline Java-based tool. Constraints can be defined for e-mail, fixed format binary messages or XML messages. Constraints include range validation for numeric fields, validation against a specified list of alternatives for any field, and dirty word filtering for text fields. The filters can be configured to either alter or remove some message fields. Messages that fail to meet the criteria specified are logged and discarded.

The SNS in accordance with the disclosed embodiment uses a distributed NM approach, with a centralized NM node providing system-level monitoring and control, and distributed NM software in the SNSs providing local management support. Any SNS can serve as the central NM node. Multiple NM nodes are supported, provided they have compatible configuration databases. Only one NM node can be active at a time. An NM node is made active through a single command at the network administrator console. The SNS in active NM mode uses its private inter-SNS trunk to manage the other SNSs.

In addition to the NM node, the SNS provides an optional audit server interface, enabling audit and monitor data to be transferred in real-time to an attached device.

The NM central node provides a command line interface that separates the security and network administrative functions. NM also provides a utility console that can be used for backup and recovery of the system configuration, as well as archive of the system audit and monitor trails. The command line interface is part of the trusted functionality (i.e., NTCB) of the SNS that is programmed to operate in a network management mode.

The network administrative functions include the following: (a) SNS control, including initialization, shut down, and restart of subscriber device interfaces, SNSs, the NM interface, and the full SNS system; (b) SNS performance management; (c) SNS configuration management, including specification of device-to-SNS connectivity and IP filtering rules; (d) SNS monitoring, including collection, storage, and display of SNS status and performance statistics; and (e) SNS time, including initialization and distribution of SNS time to all SNS nodes in the SNS.

The security administrative functions include the following: (a) security control, including shutdown and restart of subscriber device interfaces, SNSs, and the full SNS system; (b) security configuration management, including establishment and maintenance of a database of user privileges, device sensitivity ranges, and other SNS security parameters; (c) security monitoring, including collection, storage, and display of security audit data, and generation of real-time security alarms; (d) user authentication support, including establishment and maintenance of a database of user identities and passwords, as well as other user data; and (e) translation between logical sensitivity level names and the SNS internal format.

The SNS in accordance with the disclosed embodiment also enables web-based configuration of filter control files. This capability is controlled through the security administrator interface. Administrative personnel use a standard web browser to download to the SNS filter control files. The control files must be approved for use through the command line interface to prevent malicious insertion of rule changes.

The SNS network in accordance with the disclosed embodiment comprises a network trusted computing base (NTCB), which is designed to act as a reference monitor for network resources. The reference monitor requirements are that it be of minimal complexity, always invoked on object access, and tamper-proof.

One objective of the SNS is to provide sufficient protection mechanisms to provide host-specified session separation. This implies that the network must provide a trusted path, as well as ensure that process-to-process communication between host processes meets the mandatory and discretionary access control policies specified in the TNI.

An SNS in accordance with the disclosed embodiment provides network security functions for host-to-host connections, and datagram services (IP). Proxied host-to-host connection-oriented communication is provided using TCP, SMTP over TCP or a simple messaging service over TCP. This includes ensuring that data is not sent (or received) at a sensitivity level other than what is permitted for a sender (or receiver). Each SNS proxied connection operates at a single sensitivity level; however, the network supports multiple connections or sessions at different sensitivity levels.

All devices (hosts, workstations) attached to the network have associated maximum and minimum sensitivity levels. The minimum must be at or below the maximum. If the host is single-level, the maximum sensitivity level is the same as the minimum sensitivity level. Other devices are single-level, but may operate at multiple sensitivity levels within their range. The device user controls this. The host is responsible for ensuring that users can only operate at sensitivity levels for which they are cleared.

In accordance with the disclosed embodiment, hosts or remote networks that use IP may be connected to an SNS over an IEEE 802.3 interface. IP interfaces may be configured as one of (1) IP host, (2) IP router, or (3) audit server. IP hosts and routers are provided standard IP service, and can be configured as either multilevel or single-level. Single-level IP hosts and routers may be configured to be either labeled or unlabeled. Audit server hosts are only allowed to receive data from the SNS, and are delivered, using standard UDP/IP, SNS audit and monitor data and alarms.

FIG. 1 illustrates the internal SNS design in accordance with the disclosed embodiment. The ovals represent tasks and task groups while rectangles represent functional components, subsystems or hardware.

The NM node provides central management of the SNS system, including security administrator (SA) and network administrator (NA) interfaces to control the status of all network components. Each SNS has a central manager ("SNS MANAGEMENT" in FIG. 1) providing direct support for network startup, component shutdown and restart, and monitor and audit data collection. Startup, shutdown, and restart commands from network management (NM) are sent to the SNS central manager and then to the device communications task groups ("DEVICE COMM." in FIG. 1). Responses to NM commands and audit data are collected by the SNS central manager from the device communications task groups and forwarded to NM.

In accordance with the disclosed embodiment, write-up from a lower-level host to a higher-level host is achieved with two degrees of reliability. In order of increasing reliability, the two write-up methods are (a) IP and UDP; and (b) application proxies over TCP. Application proxies support SMTP, TCP, or a simple message transfer protocol. IP and UDP are datagram services that do not use acknowledgments and are only as reliable as the link hardware, transmission medium, and each component's ability to keep up with the incoming data.

Figure 2:
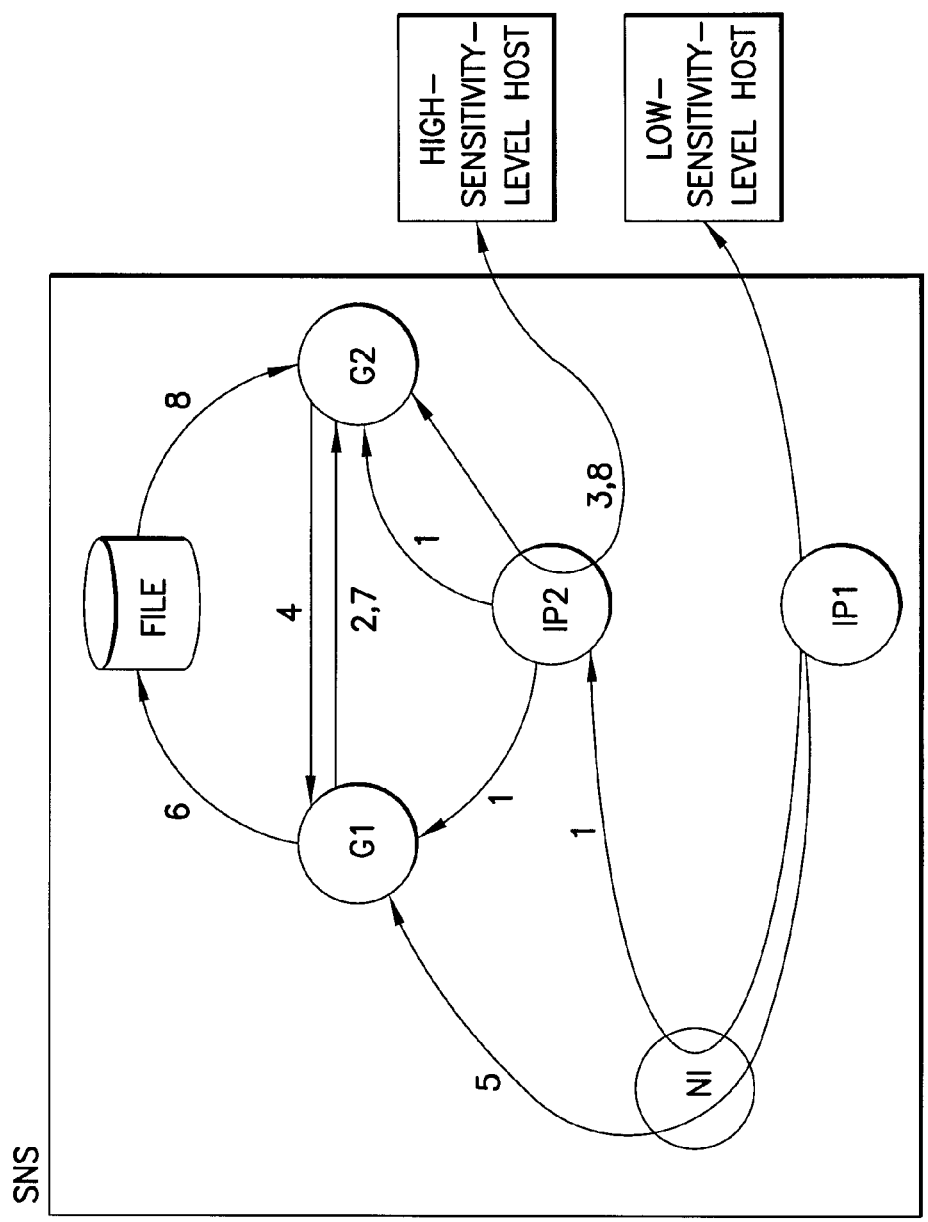
FIG. 2 is a diagram showing a TCP session established in an SNS for proxy write-up from a lower-sensitivity-level host to a higher-sensitivity-level host.

TCP sessions may be established to a host attached to a proxy gateway interface that is operating at a different sensitivity level than the source. The purpose of this capability is to enable reliable data transfer from a source at a lower sensitivity level host to a destination host at a higher sensitivity level. FIG. 2 shows how these sessions are established through the SNS. The source host must initiate the connection and specify the connection sensitivity level. The sensitivity level specified by the source host must be within its sensitivity level range. The destination host must be authorized to participate in write-up connections. The SA grants and revokes this authorization. The connection establishment and data transfer occurs in the following steps:

(1) On initiation of the connection, the SNS creates both task groups needed for the upgrade (G1 and G2 in FIG. 2).

(2) Task Group G1 sends a message to Task Group G2 to let the latter know that Task Group G1 has been created and Task Group G2 can complete the connection.

(3) Task Group G2 establishes the TCP connection with the destination host via IP interface task group IP2.

(4) Task Group G2 then sends a message (e.g., a binary value) to Task Group G1 that indicates that the TCP connection with the destination host has been established.

(5) In response to receipt of the message indicating that the TCP connection with the destination host has been established by Task Group G2, Task Group G1 then completes TCP connection establishment with the source host via network interface task group NI and IP interface task group IP1. In a typical write-up connection, the source host then begins transmitting data.

(6) The Task Group G1 executes the proxy protocol with the source host and stores the message locally in the SNS file system ("FILE" in FIG. 2).

(7) Once the message transfer is complete, Task Group G1 forwards the message to Task Group G2.

(8) Task Group G2 reads the data from the file and executes the proxy protocol with the target host to forward the data to the destination host via IP interface task group IP2.

For the connection to be established as a write-up connection, the following must be true: (a) The sensitivity level specified by the source host must be dominated by the destination host's maximum sensitivity level. (2) The destination host must be authorized to establish this connection type (i.e., the destination host must have write-up privilege, which is granted by the network SA) for the write-up to occur.

The SNS also enables filtering of upgrade messages. The process is similar to that described above, however, the SNS also creates a third, NTCB, task group that is inserted between Task Groups G1 and G2 in FIG. 2. That third task group receives messages from Task Group G1 and forwards validated messages to Task Group G2 for forwarding to the host. The process for establishing the connection and transferring data is the same as that used for downgrade proxies, described hereinafter.

The SNS provides filtering of connections from high to low. The process is similar to that described above; however, for downgrade, there must be a filter task group for the outbound interface. For upgrade the filter is optional. The SA controls downgrade through multiple mechanisms: (a) The sensitivity level specified by the source host must be dominated by the destination host's maximum downgrade sensitivity level. (b) The outbound interface must be designated by the SA as a downgrade interface. (c) The SA must specify which proxy type and filter type is to be used at the outbound interface based on the TCP port number. (d) The SA must specify support files used by the filter.

Figure 3:
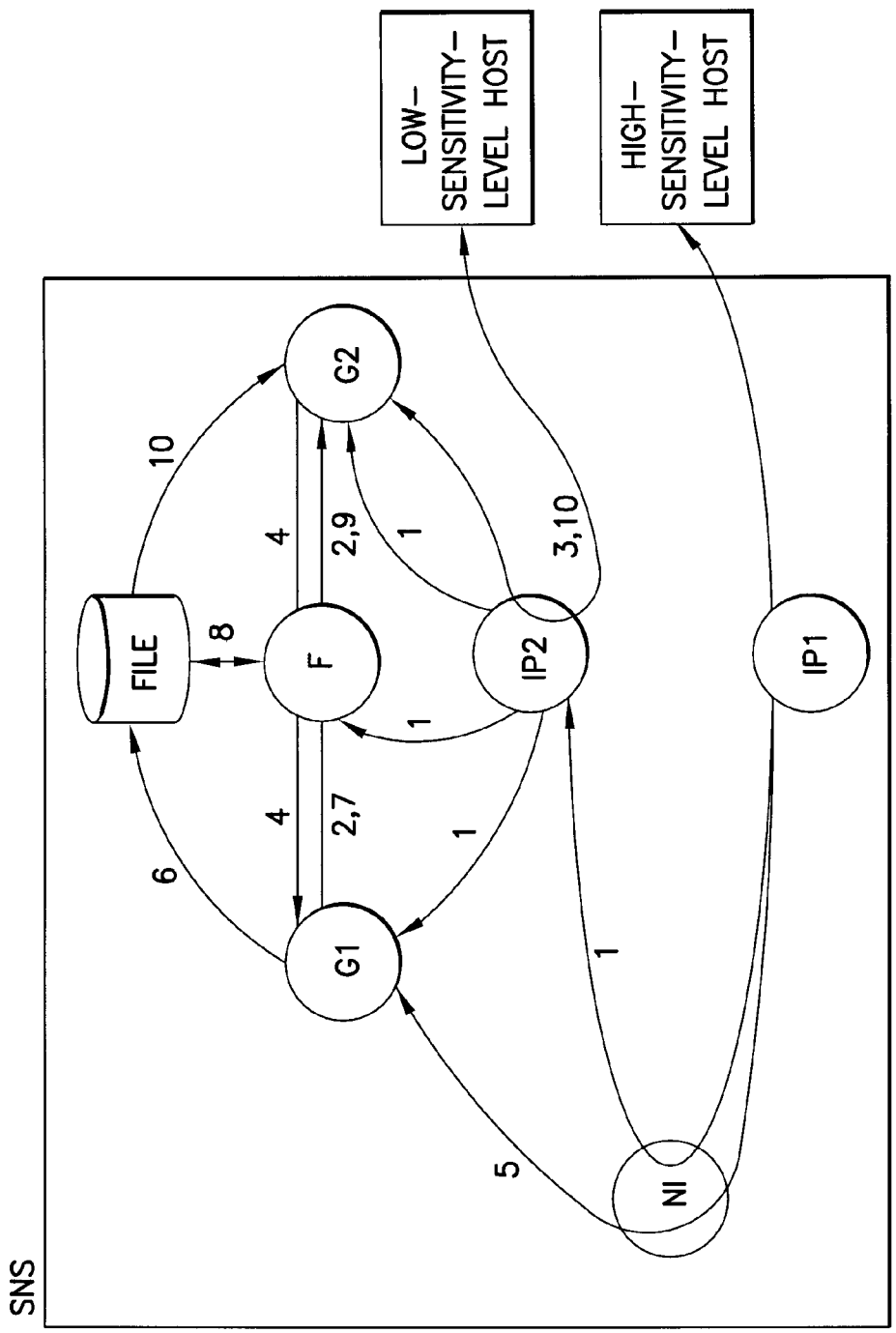
FIG. 3 is a diagram showing a TCP session established in an SNS for proxy downgrade from a higher-sensitivity-level host to a lower-sensitivity-level host.

The major differences from the above process is that in step 1, the SNS also creates a third, NTCB filter task group that is inserted between Task Groups G1 and G2 in FIG. 3. The initialization and reception of messages by Task Group G1 (steps 1-6) is the same for upgrade and downgrade; however, in step 7, where Task Group G1 forwards data, Task Group G1 sends the data to Task Group F instead, as shown in FIG. 3. The subsequent steps are as follows:

(7) The filter task group F receives the data from Task Group G1.

(8) The filter task group F filters the data based on the rule set specified by the SA.

(9) On success, the filter task group F forwards the data for validated messages to Task Group G2 for forwarding to the host.

(10) Task Group G2 reads the data from the file and executes the proxy protocol with the target host to forward the data to the destination host via IP interface task group IP2.

Note that the process for downgrade filtering is identical to that for upgrade filtering. The SNS has a standard set of proxies and a standard filter. The filter is controlled by a file that specifies the filtering rules for the port number for a specific interface.

The filtering rules are defined in an XML-like format. When a message is to be filtered, the filter task group parses the data of the message in an XML-like tree and applies the filtering rules to it. When a message comes in, its tags and associated data (i.e., fields) can be in random order, but the filtering rules are in a preset order. "Parsing" means that the message has to be reordered to match the preset order of the filtering rules. Then the filter rules are applied on a one-to-one basis, one rule per tree node.

Custom proxies and filters can be added to the SNS, but require additional software to be integrated into the system. Such proxies and filters use a standard framework, so that their operation is identical to what is described above. New proxies require no modification to the core algorithms in the SNS, just changes to the command language to allow specification of the new proxy. Filters are part of the NTCB, and so integrating a new filter is a more significant change to the SNS.

In accordance with the above-described embodiment, both the forwarding process and the receiving process are created upon connection initialization, and the receiving process is held off from communicating with the source host until the forwarding process has created a connection with the destination host. This solves the problem of message loss when the destination host is unreachable.

Figure 4:
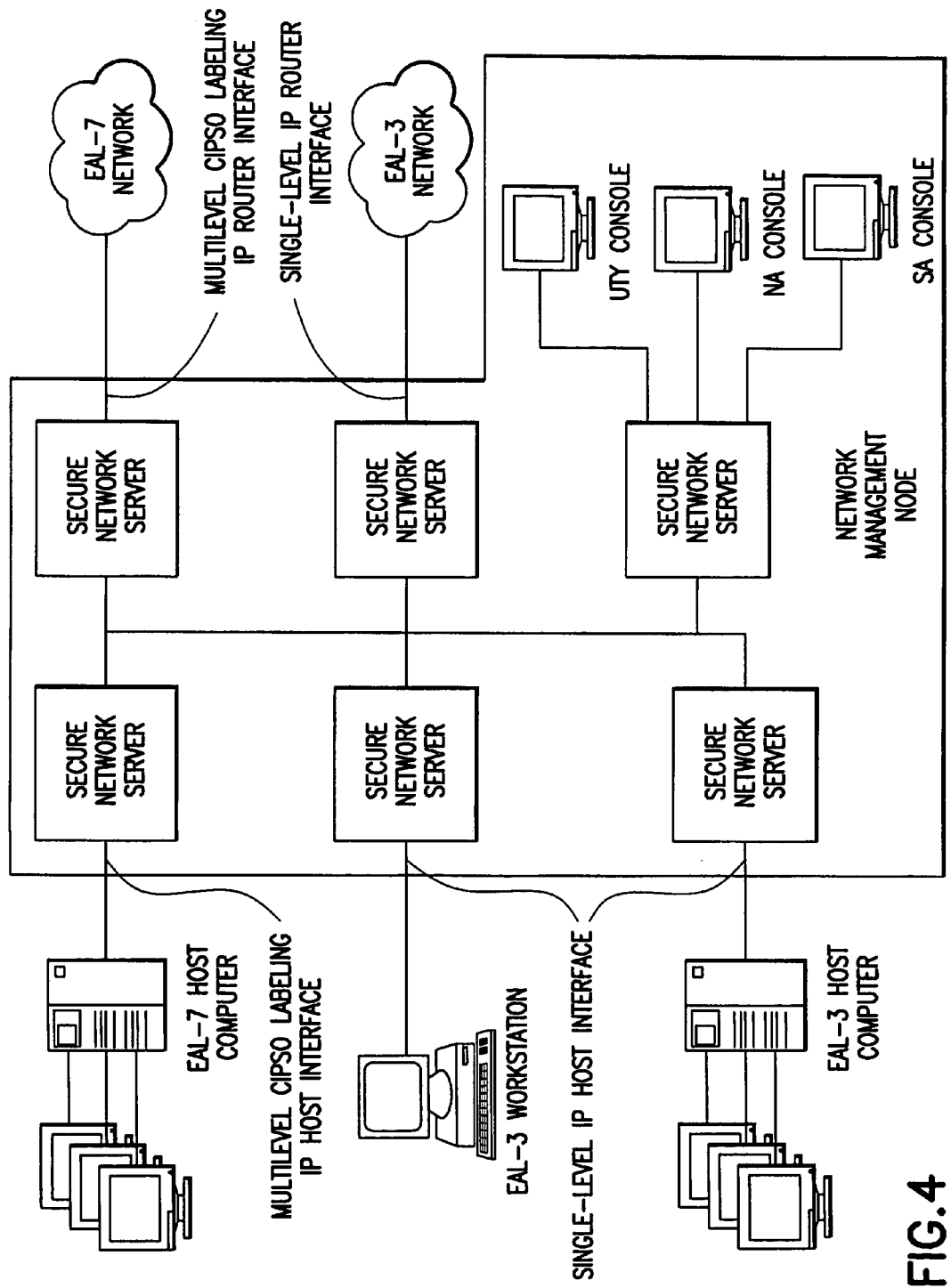
FIG. 4 is a block diagram showing an exemplary SNS configuration.

Hereinafter, how to configure and interconnect automated information system components to construct a distributed system, using SNSs to connect the components, and achieve a desired level of system assurance, will be described. Requirements to maintain a high level of system assurance using SNSs to interconnect system devices are presented, including necessary device characteristics and SA actions. FIG. 4 presents an exemplary EAL-7 configuration.

An SNS supports hosts through an IP host or IP router interface. As seen in the exemplary SNS configuration depicted in FIG. 4, a multiplicity of secure network servers (SNSs), including a Network Management Node SNS, are interconnected via a network. The SNS shown in the upper row and on the right-hand side of the configuration is connected to a network having an Evaluation Assurance Level of EAL-7 by way of a multilevel CIPSO labeling IP router interface. The SNS shown in the upper row and on the left-hand side of the configuration is connected to a host computer having an Evaluation Assurance Level of EAL-7 by way of a multilevel CIPSO labeling IP host interface. The SNS shown in the middle row and on the right-hand side of the configuration is connected to a network having an Evaluation Assurance Level of EAL-3 by way of a single-level IP router interface. The SNS shown in the middle row and on the left-hand side of the configuration is connected to a workstation having an Evaluation Assurance Level of EAL-3 by way of a single-level IP host interface. The SNS shown in the lower row and on the left-hand side of the configuration is connected to a host computer having an Evaluation Assurance Level of EAL-3 by way of a single-level IP host interface. The network management node SNS can be accessed by an authorized user via a security administrator (SA) console, a network administrator (NA) console and a utility (UTY) console. Each host attached to the SNS must provide the authentication mechanisms, discretionary access enforcement, and audit mechanisms necessary to meet the system-level requirements. Hosts attached to the SNS through an MLS interface (i.e., the interface's maximum and minimum sensitivity levels are not the same) must also provide mandatory access controls. The assurance level for such MLS hosts must also meet the system-level assurance requirements. That is, if an MLS attached host is rated as EAL-N, where N is a positive integer, then the system provides EAL-N assurance for the range of sensitivity levels assigned to that host by the system SA.

If all SNS interfaces to a host (IP) are configured to operate at the same sensitivity level, then the host is single-level from the point of view of the network. A network of single-level hosts, connected through a system of SNSs, results in a system that has EAL-7 assurance.

There are two possible scenarios that make a host's interface to the SNS multilevel: (a) more than one single-level interface, where two of the interfaces are configured to operate at different sensitivity levels; and (2) an IP interface configured to operate at multiple sensitivity levels. In both cases, the host must meet the system-level assurance requirements. Connecting lower assurance multilevel hosts through the SNS results in a system where the system-level assurance is reduced to that of the lowest assurance MLS host. However, if the hosts are constrained by the SNS to small sensitivity ranges, the security risk can be reduced.

For IP interfaces, the host's range of sensitivity levels assigned by the SA must be consistent with the sensitivity levels assigned by the host administrator to the host's side of the interface.

In accordance with the disclosed embodiment, the SNS supports management of SNS filtering rule sets from remote hosts. The SA controls which interface can be used for this capability by setting the "Trusted Configuration Server" control for the management interface. The SNS enables use of a standard web browser to support this feature, plus a custom Java tool for creating SNS filtering rule sets. The SNS provides safeguards against compromise through this interface. Besides limiting which host interfaces can use this mechanism, the SNS validates all input to ensure that it is valid and consistent filtering rules, and requires review by the system SA before accepting the filtering rule set file into the system.

Administrators use the Java-based tool to define filtering rule sets. These rule sets are downloaded to the SNS over HTTP. To support low-assurance hosts performing this management function and to minimize the complexity of the SNS's NTCB, the HTTP web server on the SNS operates as a non-NTCB task group.

Tasks are the principal active entities managed by the executive; however, task groups form the unit of encapsulation provided by the executive. Task groups are either NTCB or non-NTCB. The executive enforces a policy of complete separation of non-NTCB task groups. The executive keeps track of which tasks belong to each task group, and ensures that non-NTCB task groups do not share data or even communicate.

The security and networking features of each SNS can be configured using an HTTP web server task group (non-NTCB) embedded in the network management SNS. This web server is accessible to administrators through a standard web browser on a computer that connects to the network management SNS via a network. The configuration of an SNS can be modified by downloading modified configuration data from the web browser on the remote computer to the web server on the network management SNS via the HTTP interface. These changes in SNS configuration are reviewed and accepted using a command line interface that is part of the trusted security functionality of the network management SNS. This allows the web server to be outside the SNS's trusted security functionality.

In the disclosed embodiment, the HTTP web server within the network management SNS is a standard SNS proxy process that is created when an HTTP session is created with the network management SNS's router address as the target host. The SNS security administrator controls this feature by setting a configuration flag for each Ethernet interface that is used as an IP router interface. If the configuration flag is not set, the interface will not allow the web server to be created.

Upon creation, the web server uses a trusted process in the network management SNS to read the SNS configuration data and present forms to the administrative user over HTTP. The administrator uses a standard HTTP web browser at a remote computer to enter data in the forms and submit the data to the network management SNS. The web server uses the same trusted process to place the modified configuration data into temporary storage for review by administrators using the command line interface of the network management SNS. After both network and security administrator review of the changes, the changes are accepted into the SNS for use. This approach can be used for most SNS configuration parameters. Secure Sockets Layer (SSL) and other security mechanisms (e.g., user authentication) can be used to provide additional security across the Ethernet interface from the SNS to the client web browser, although none of these mechanisms is required to ensure that the data entered is correct configuration data.

The executive does not associate sensitivity levels with tasks, however, the session manager that creates a single-level task group records that task group's sensitivity level. The executive does not require any information about sensitivity levels, because the policy enforced by the executive is one of complete separation and is not based on the sensitivity levels of the tasks. All non-NTCB tasks within a task group operate at the same sensitivity level. When a task has access to a data segment in memory, it has both read and write access. Thus the sensitivity level of the data segments to which a non-NTCB task has access is the same as the task's sensitivity level. NTCB tasks have no sensitivity level. They typically provide services that require operation at multiple sensitivity levels. All the NTCB tasks are verified to operate securely.

TCP call gates are provided for filter and application proxy task groups to initialize, send data to and receive data from the network, send files between proxies, and send error reports to the IP Interface task group. TCP call gates are called by proxy task groups and use the executive.

A file system separates a disk into NM and user partitions. This separation provides a mechanism that prevents NM from having to compete with user task groups for resources.

A file mover task group is used by the web server task group to move files between the NM and user partitions. The web server task group enables download of filter rule set files. The file mover task group receives file names from the web server through an executive mailbox. The file mover task group copies a file from the user partition to a temporary directory in the NM partition. Files in the temporary directory in the NM partition are ready for review by the SA before the file can be used in configuring proxies. The file mover software interfaces with web server (via executive), executive, and IP interface software. The file mover task group is part of the trusted security functionality, while the web server task group is part of the non-trusted security functionality of the SNS.

A generic filter process provides filtering for messages received in the SNS through non-NTCB proxies. The generic filter can filter e-mail, XML messages or fixed format messages. The generic filter task group comprises a single task. The generic filter uses the TCP gates to initialize, and then waits for messages to filter through the TCP sleep gate. The sleep gate returns a file name of the file that contains the message. The filter task uses the operating system gates to read and write the message file. The filter calls the validate function, which executes the rules provided in the filter file provided during initialization. Following validation, if the message is validated, the filter task calls the TCP send file gate to forward the file name to the downstream proxy task group. If the message fails validation, the filter task calls the TCP transfer gate to send the file name to the IP interface task group, which uses the file to audit and log the error. On receipt of a null file name, the filter task calls the TCP exit gate, which terminates the task group.

Filtering is controlled by a message filter task group file that specifies filtering rules. Filter task group files are assigned to the filter in the proxy table setup by the SA when adding proxies. Separate filter task group files can be specified for separate proxy specifications. The filter task group file specifies rules for message fields. For e-mail and XML messages, fields are defined by tags. For fixed format messages, fields are defined by offset into the message. Filter rules include type-dependent filters. For number types, range and discrete value checks can be specified. For text fields, discrete values or dirty word searches can be specified. Actions can be specified that enable discarding the message, stripping out a field for e-mail or XML messages, replacing a field for e-mail or XML messages, or zeroing a field for fixed format messages.

The filter rules can be specific to the source IP address for the sender of the message. The filter task group file format allows specification of source address and mask for a set of rules. This enables source or interface specific filtering rules. The filter task groups interface with the IP software, TCP gates, proxy task groups (via TCP gates), and executive.

FIGS. 5 through 17 define the content of exemplary filter task group files. The filter rules are defined by a knowledgeable person as to what data can be moved between security domains. As a message is moved through the SNS, its content is evaluated against the constraints in the applicable filter file. A message that violates these constraints is rejected by the SNS; otherwise it is allowed to pass through.

Figure 5:
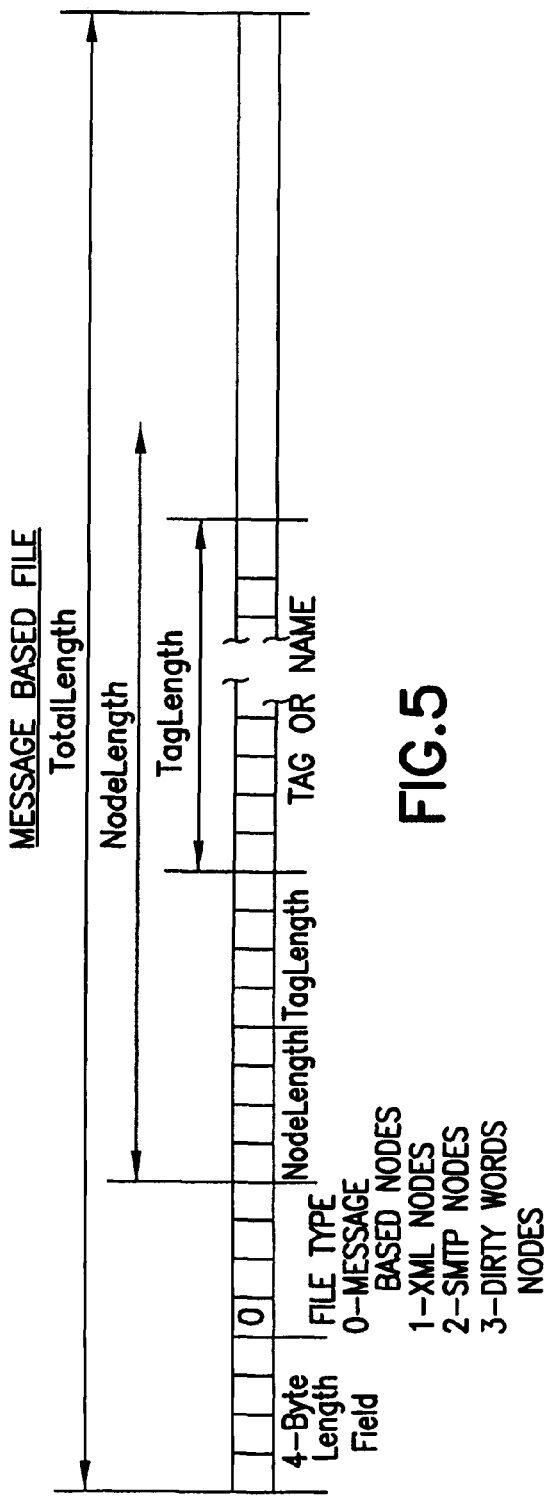
FIGS. 5 through 17 are diagrams showing the format of the filter rule set files in accordance with the disclosed embodiment of the invention.
Figure 6:
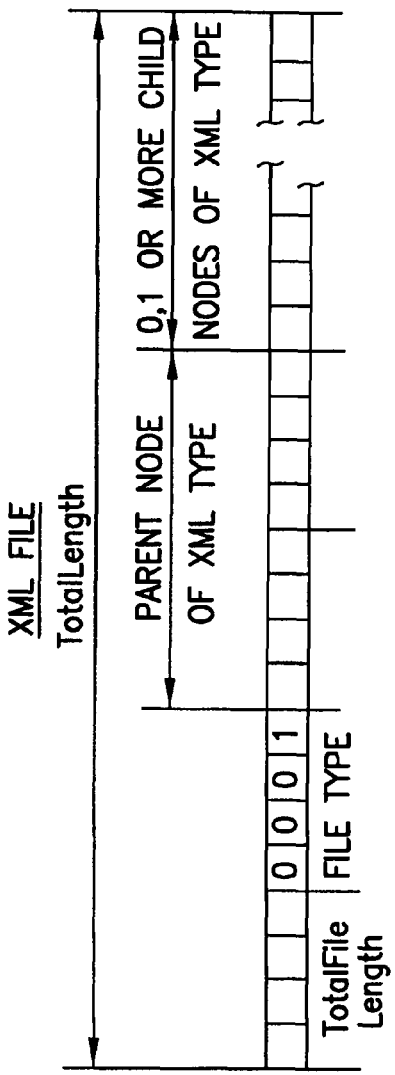
Figure 7:
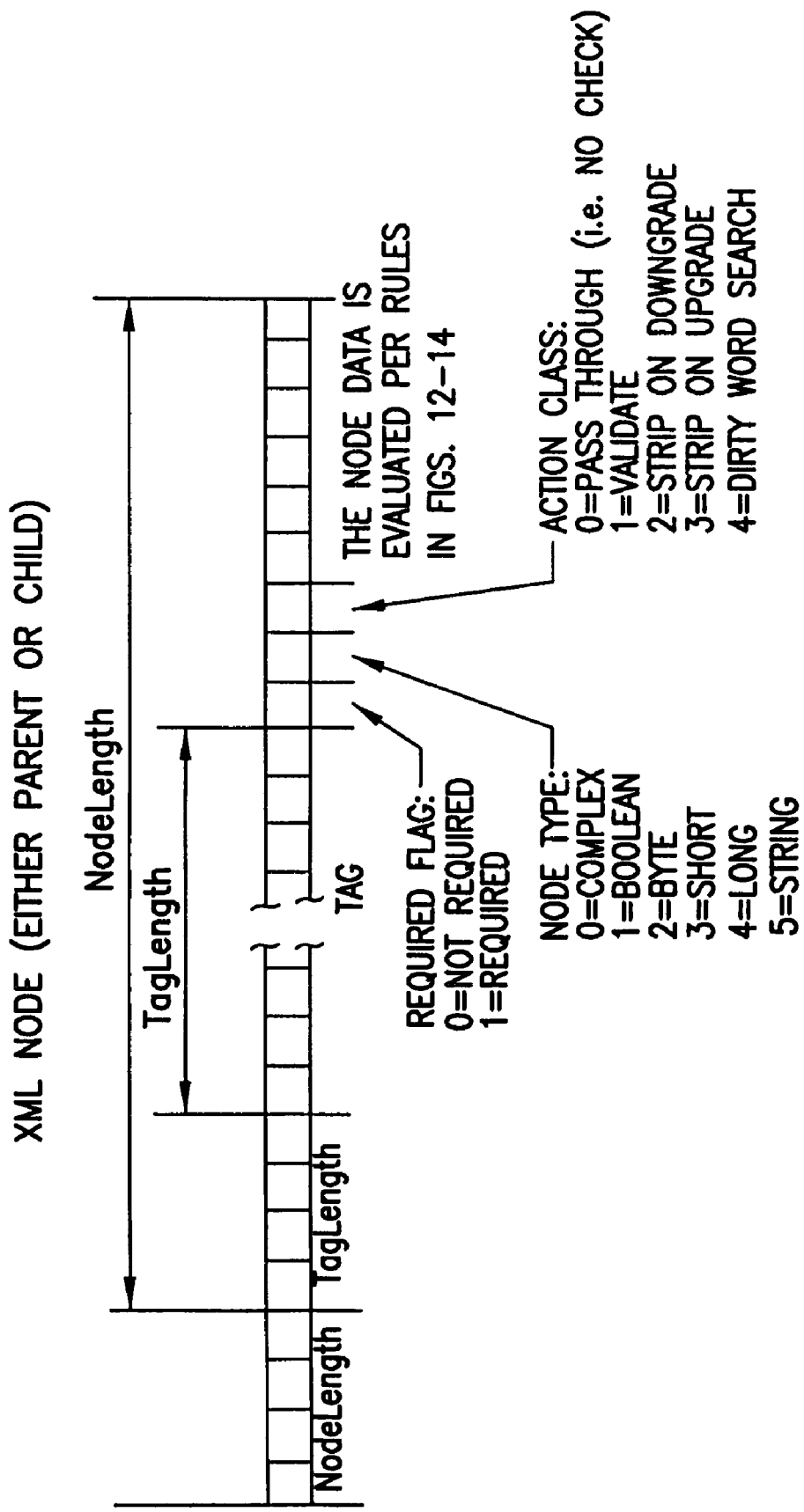

Each filter file starts with a field (named "TotalFileLength") containing data representing the total length of the file. The next field (named "FileType") contains data indicating the file type: 0- message based nodes; 1- XML nodes; 2- SMTP nodes; 3- dirty words nodes. FIG. 5 shows the format of a file for filtering a message based node. FIG. 6 shows the format of a file containing filtering rules used to validate XML messages. FIG. 7 shows the format of a portion of a file for filtering an XML node (either parent or child). In each of FIGS. 5-17, a field named "NodeLength" is included that contains a number representing the length of the node field, and another field named "TagLength" is included that contains a number representing the length of the tag field.

Figure 8:
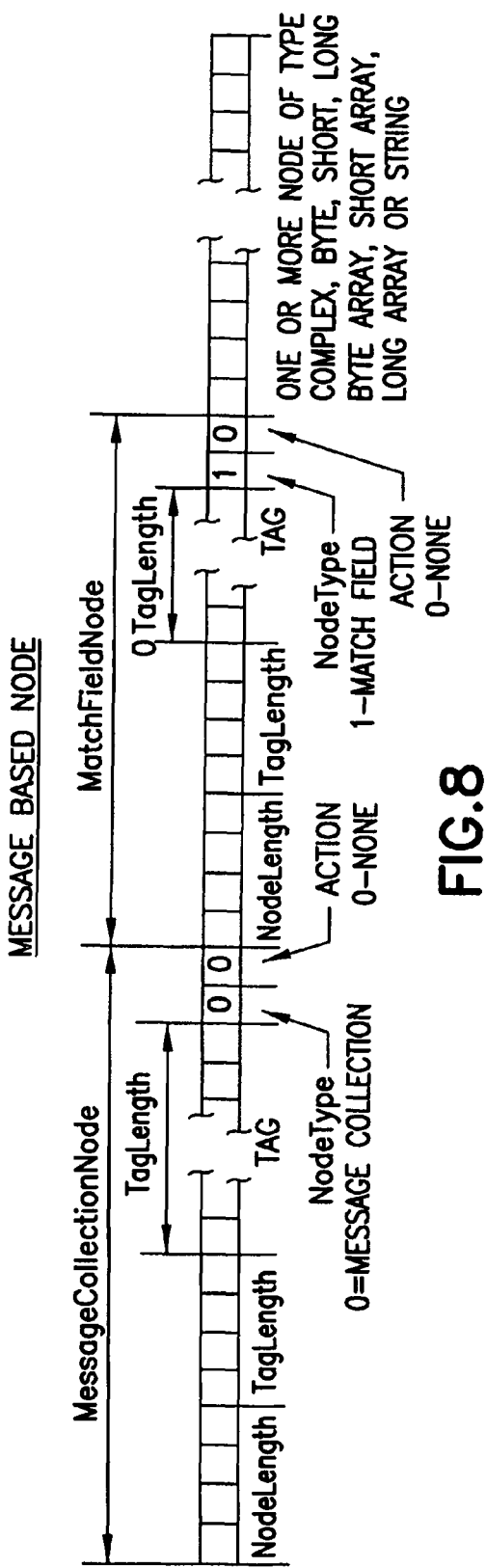

FIG. 8 shows the format of a portion of a file for filtering a message based node. The first node in a message file is a message collection node (one per file). The second node in the message file is a match field node (one per file). The match field is used to match the incoming message to the appropriate rule.

Figure 9:
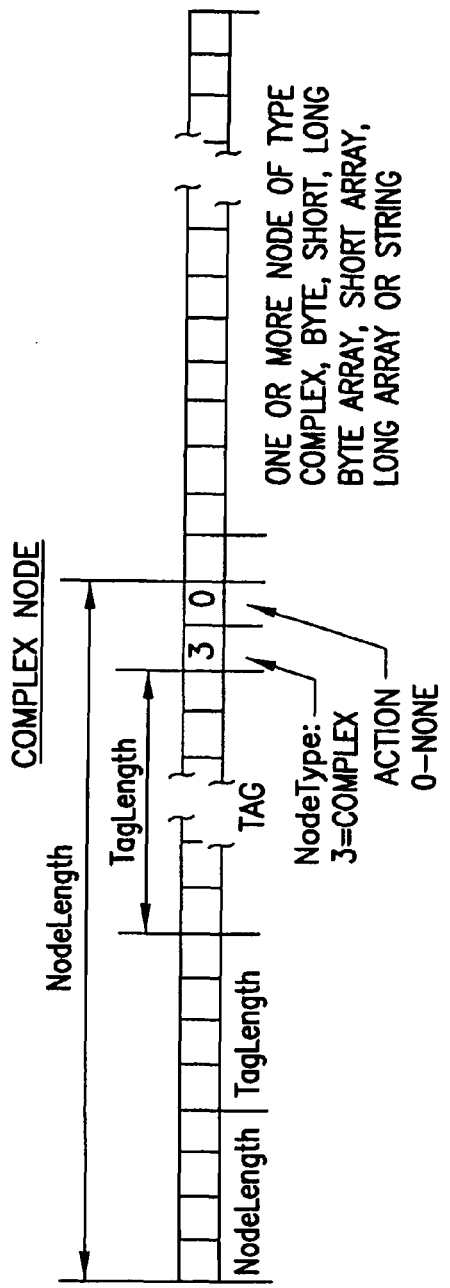

FIG. 9 shows the format of a portion of a file for filtering a complex node, which is a sub-collection of nodes. The field "tag" in FIG. 9 contains a string representing the "name" of the complex node.

Figure 10:
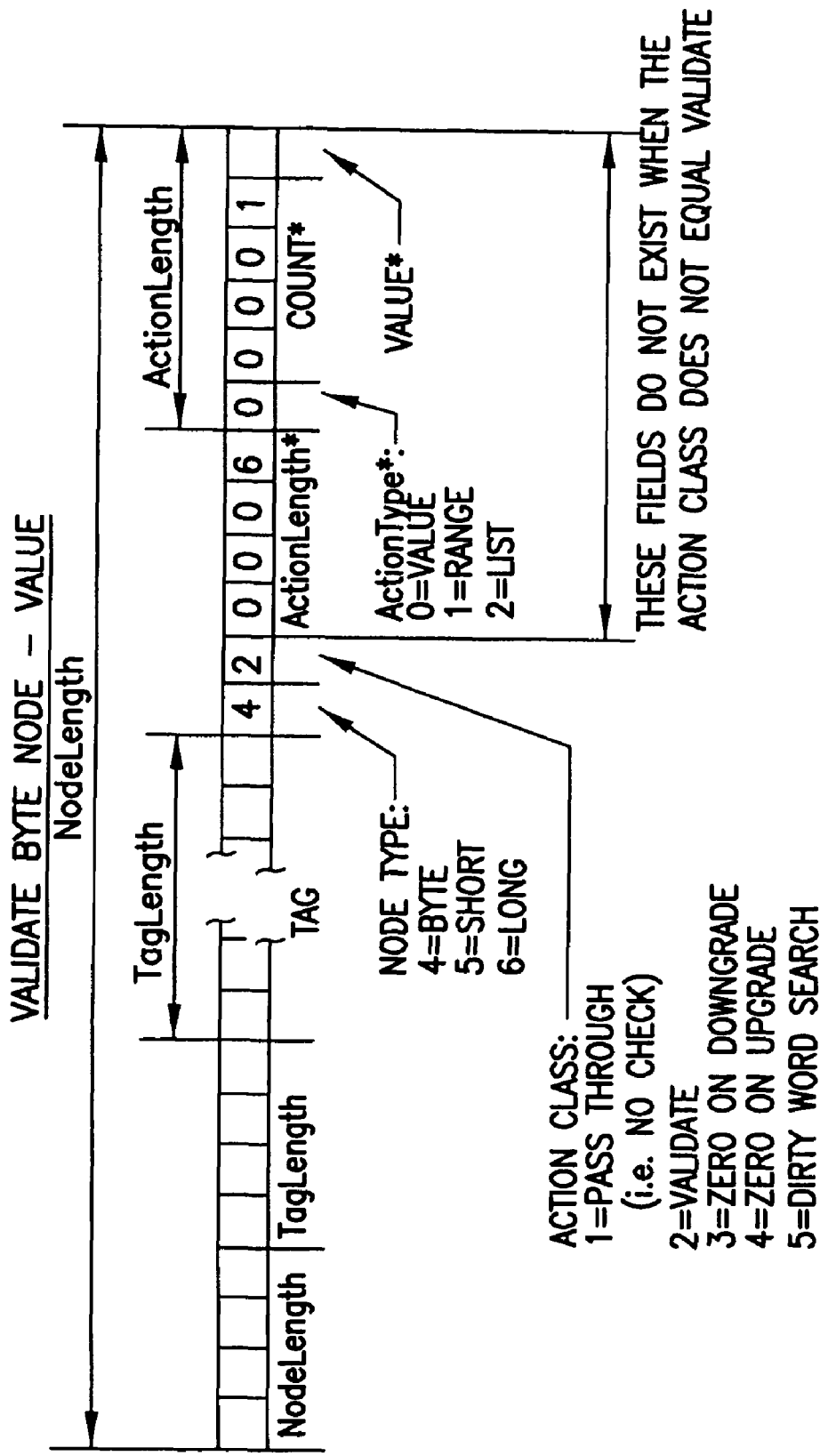
Figure 11:
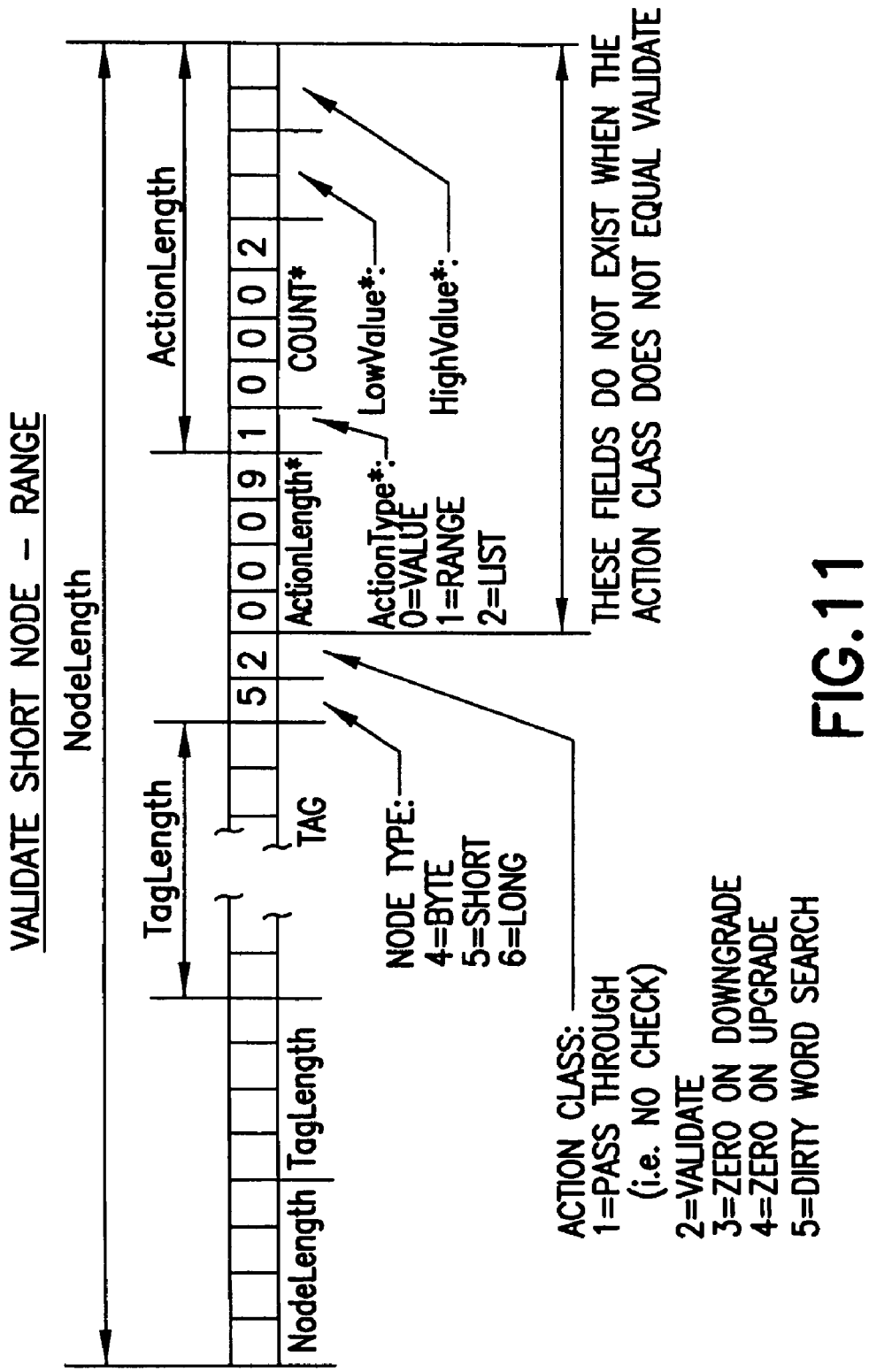
Figure 12:
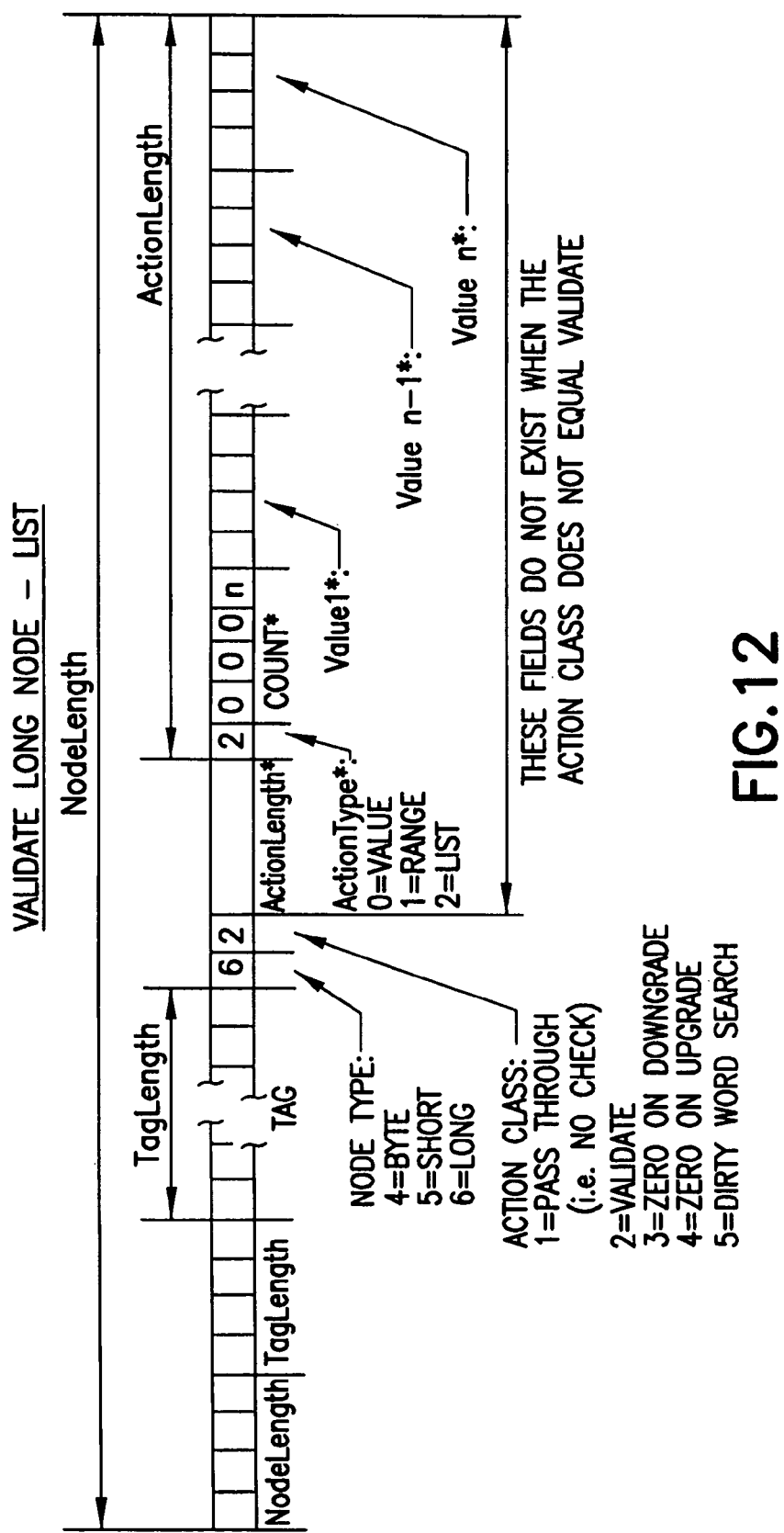

FIGS. 10 through 12 show the format of a portion of a filter file for validating values, ranges of values or lists of values found in a byte, short or long node. In the example of FIG. 10, the node type is "4=byte" and the action type is "0=value". In the example of FIG. 11, the node type is "5=short" and the action type is "1=range". In the example of FIG. 12, the node type is "6=long" and the action type is "2=list". In FIGS. 10-12 (as well as in FIGS. 13-16) the portions of filter files depicted include a field named "ActionLength" that contains a number representing the length of the action field.

Figure 13:
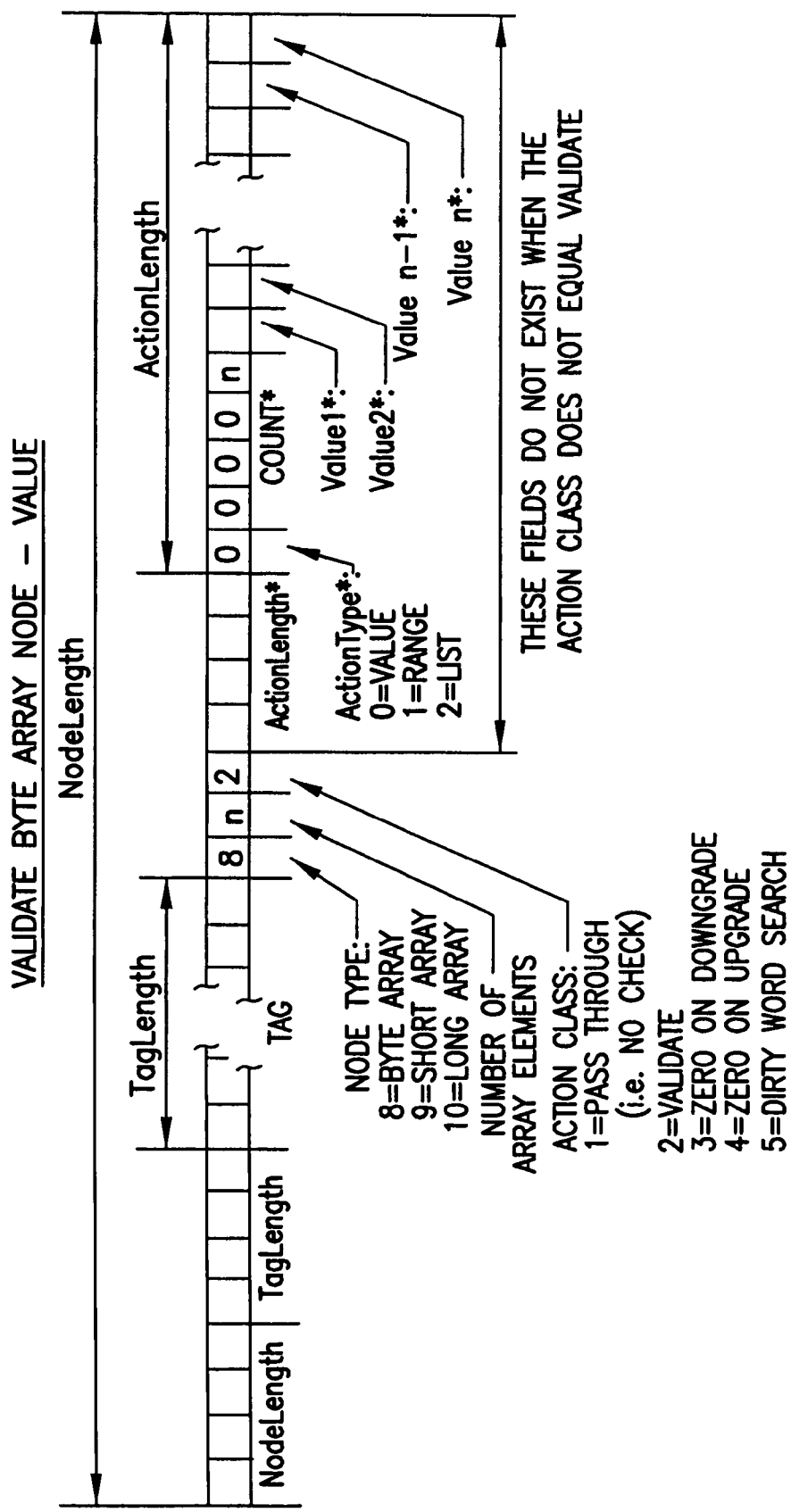
Figure 14:
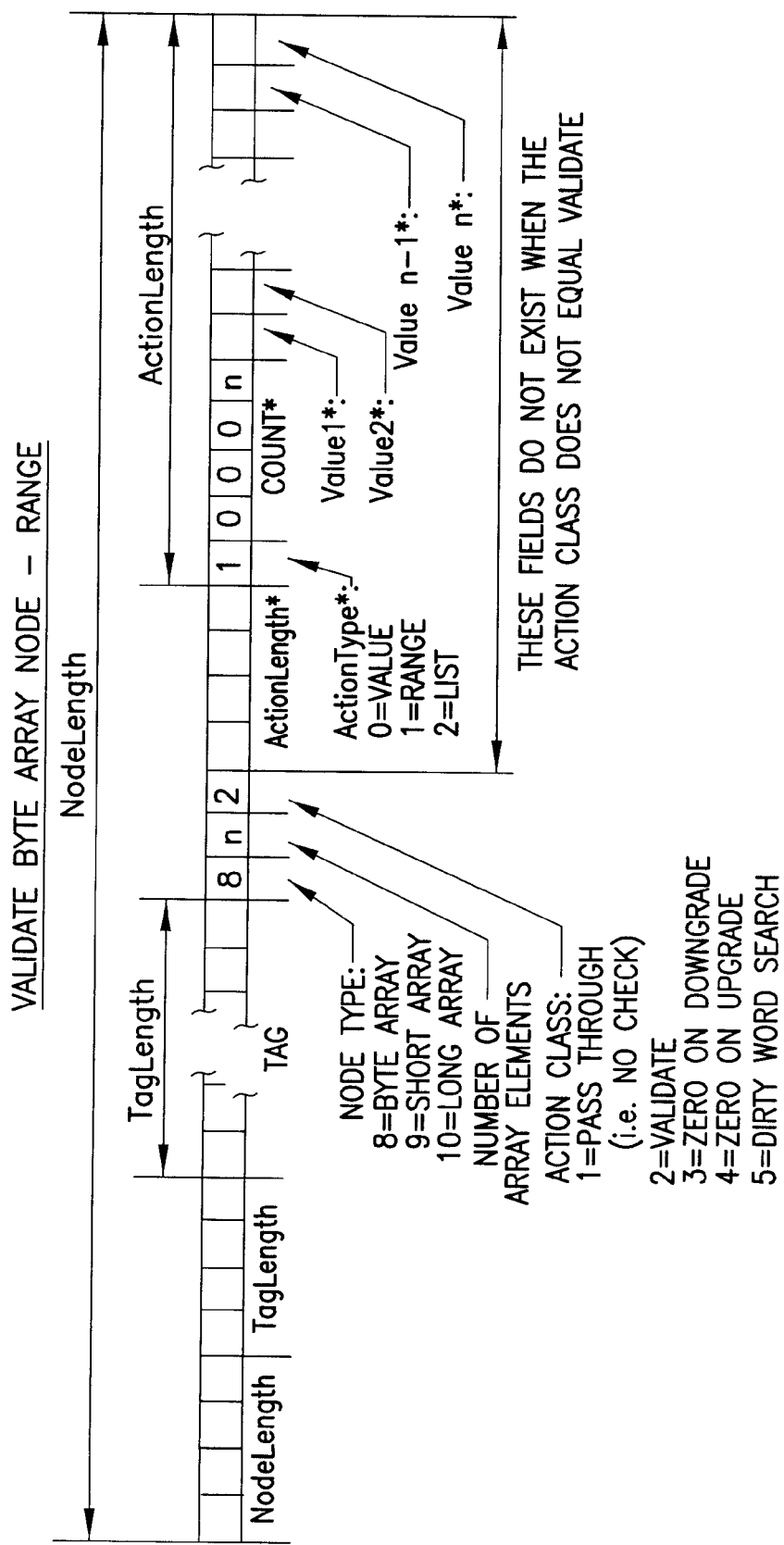

FIGS. 13 and 14 show the format of a portion of a filter file for validating values, ranges of values or lists of values found in a byte, short or long array node. In the example of FIG. 13, the node type is "8=byte array" and the action type is "0=value". In the example of FIG. 14, the node type is "6=long" and the action type is "2=list".

Figure 15:
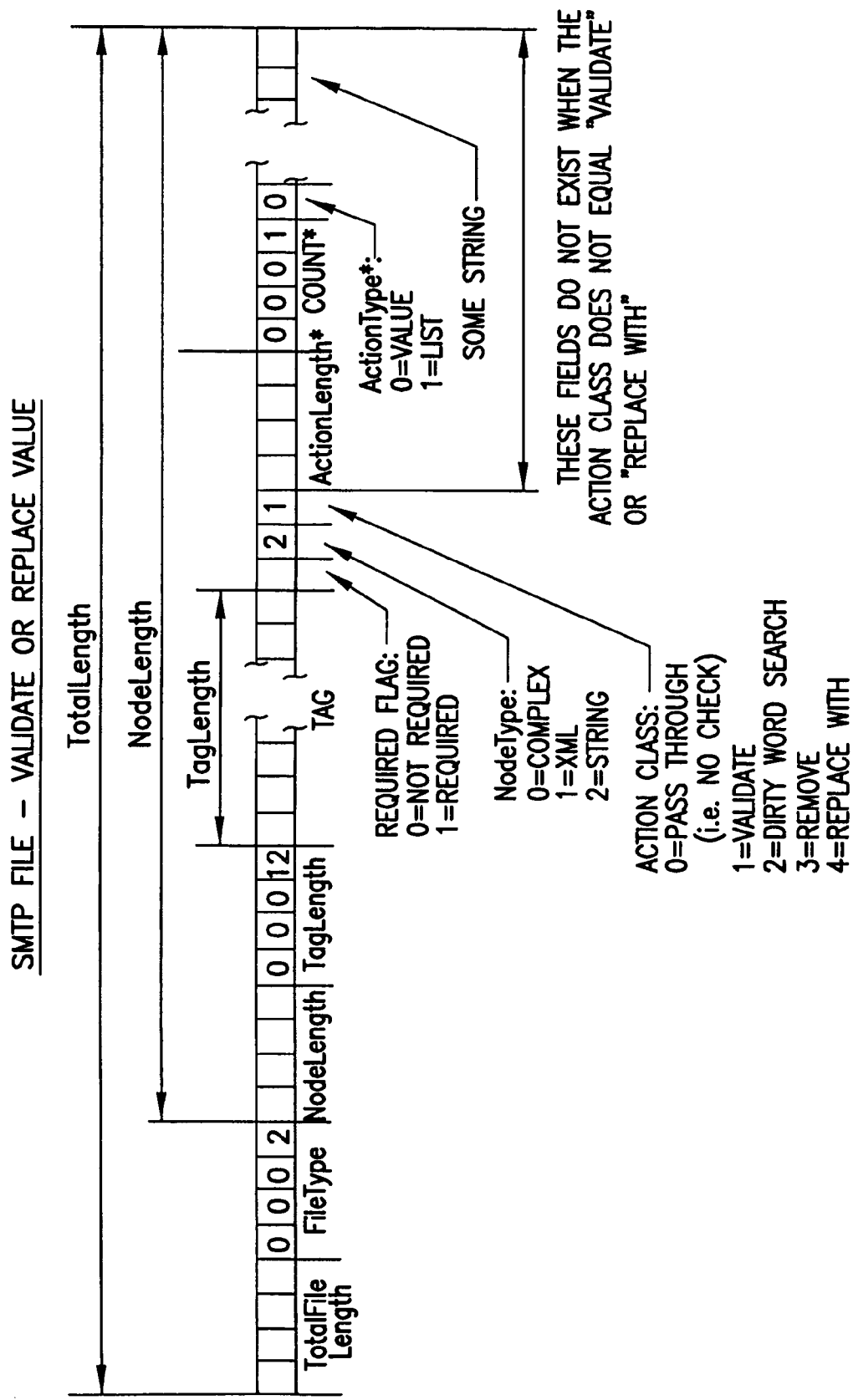
Figure 16:
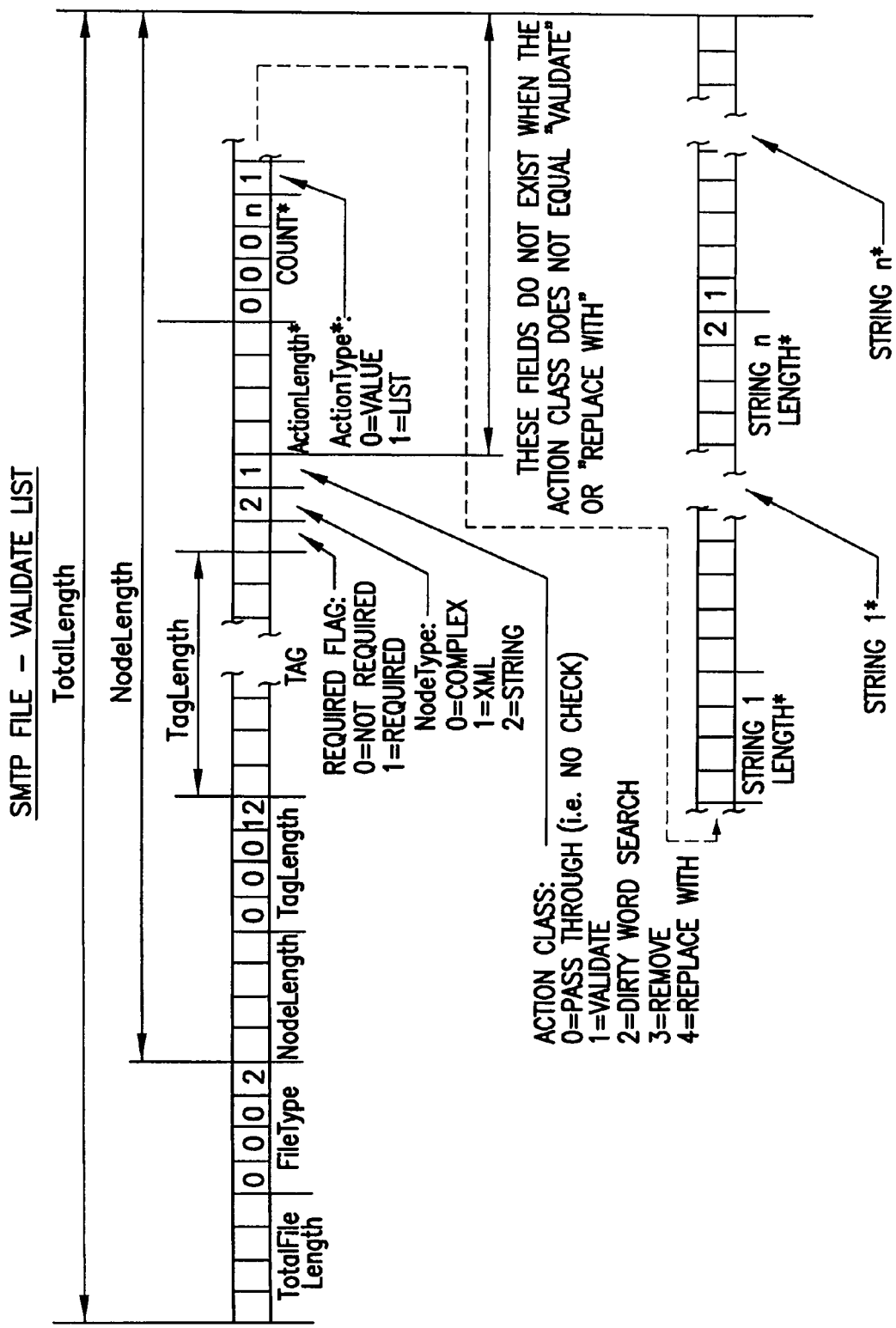

FIGS. 15 and 16 show the format of a portion of a filter file for validating or replacing values or validating lists of values found in an e-mail message. In the example of FIG. 15, the node type is "2=string", the action class is "1=validate" and the action type is "0=value". In the example of FIG. 16, the node type is "2=string", the action class is "1=validate" and the action type is "1=list".

Figure 17:
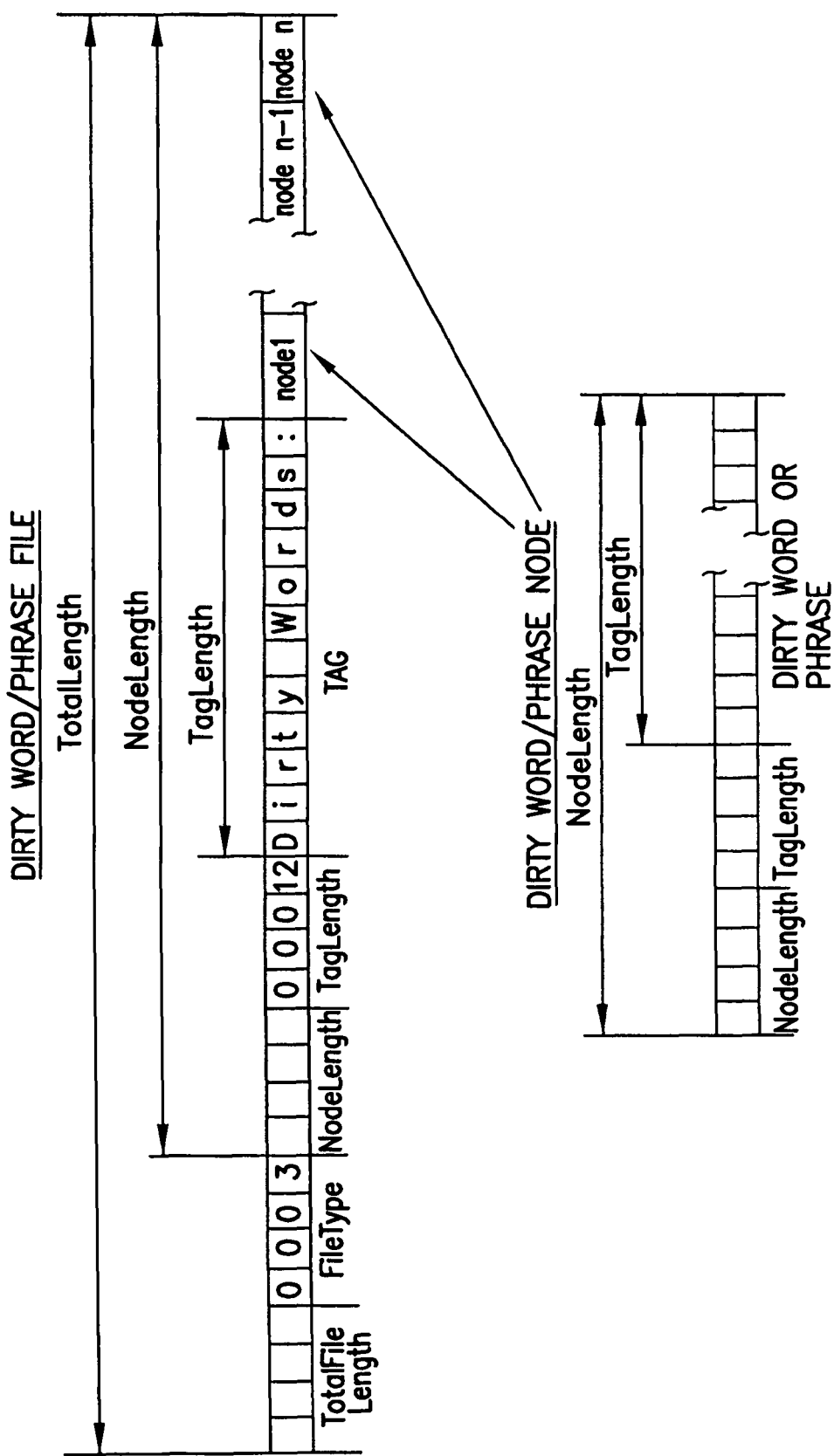

FIG. 17 shows a file containing a list of "dirty words" or "phrases" that is used to validate the contents of e-mail (SMTP) messages or XML type messages that contain a string of ASCII characters.

Custom filters can be added to the SNS using a filter development framework. The framework provides the initialization and termination software, so that only a filtering 'c' program is needed to provide filtering capabilities. Custom filters are used when the generic filter does not provide sufficient functionality. Custom filters alter the NTCB, so their use should be minimized. However, the changes are localized to just the filtering algorithm, which reduces the security risk. The custom filter task groups interface with the IP software, TCP gates, proxy task groups (via TCP gates), and executive.

Proxy task groups support a protocol for transfer of data through the SNS. The SNS in accordance with the disclosed embodiment has the following types of proxies: (a) TCP; (b) SMTP; and (c) message transfer protocol. The TCP proxy task group forwards TCP segments through the SNS. The SMTP proxy task group provides the standard SMTP protocol for the IP interface. SMTP messages are forwarded through the SNS.

The SNS disclosed herein is a high-assurance, multi-level security (MLS) network guard that enables information sharing across network boundaries, while enforcing established security and policy rules. The SNS allows: interconnection of single-level networks, hosts, and workstations that operate at different levels; connection of single-level networks, hosts, and workstations into a multilevel network; separation of multi-level components that have different accreditation ranges; routing of data between multilevel and single-level networks; one-way transfer of data from a lower security enclave to higher security level workstations, hosts, or networks; movement of e-mail between multiple security levels consistent with security and policy rules as an e-mail firewall; one-way transfer of data from a higher security enclave to lower security level workstations, hosts, or networks based on a predefined downgrade rule set; information upgrade to a higher domain; and message downgrade and release to a lower domain, subject to downgrade filter rules.

The SNS, configured as a high-assurance guard, can be used to exchange information between enclaves at different security classification levels. Public information from external, unclassified networks can be transmitted securely into classified networks without compromising sensitive or classified information. A two-stage proxy scheme is used within the SNS to ensure that unclassified information is transferred into the SNS and then upgraded to a classification level appropriate to the target network.

This approach prevents any sensitive or classified information from being exposed to the unclassified network by breaking the transaction into a "low" process and a "high" process within the SNS. In this way, the results from processes running on unclassified systems could be safely used as input to other processes running on classified systems. For example, real-time weather forecasts could be pulled from public sources and pushed into highly sensitive networks for use in operational planning.

Automated downgrade techniques can be implemented within the SNS to facilitate communications from a "high" network to a "low" network by adding approved filters to this two-stage proxy technique. In this way, a preauthorized set of messages could be sent from a classified system to the external, unclassified simulations (e.g., situation reports, 'start,' 'pause,' and 'stop' commands, etc.) or approved information could be downgraded from a classified system for use in an unclassified network.

The SNS supports both single-level and multi-level interfaces. Security labels are added and deleted from network traffic, as needed, by using the industry standard Commercial Internet Protocol Security Options (CIPSO) field in the IP header. These CIPSO labels support both hierarchical security classification domains and non-hierarchical "need-to-know" compartments. This approach supports current single-level networks as well as networks containing MLS or compartmented workstations.

Single-level data read into the SNS is tagged internally to the SNS using the CIPSO labels. The label assigned is that of the interface that the data came from. As the data moves through the SNS, the label is revised as appropriate. Assuming the receiving host is single level, then the tag is stripped off by the SNS prior to the data being transmitted to the receiving host. However, if the receiving host has multilevel security, then the CIPSO labels can be retained.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of transferring data between networks operating at different security levels, said data being a stream of messages, each message comprising fields having a field length selected from a plurality of different field lengths, comprising the following steps:
    (a) establishing a Transmission Control Protocol (TCP) session in response to initiation of a connection of a source host to a secure network server, said source host having a first security level, and said establishing a TCP session comprising creating a receiving task group, creating a forwarding task group and creating a generic filtering task group;
    (b) providing a filter file that specifies filtering rules for a port number for an interface with a destination host, said destination host having a second security level different than said first security level;
    (c) establishing a connection between said forwarding task group and said destination host that allows said forwarding task group to send messages to said destination host;
    (d) establishing a connection between said receiving task group and said source host that allows said receiving task group to receive a message transmitted by said source host;

(e) said receiving task group storing said message received from said source host in a file having a file name and then forwarding said file name to said filtering task group;

(f) said filtering task group receiving said filtering rules from said filter file during initialization, reading data of said message stored in said file having said file name, validating that said read data matches a preset order and content values of said filtering rules, and filtering the content of said read data in accordance with said filtering rules;

(g) after the steps recited in (f) have been completed, said filtering task group sending a message to said forwarding task group, said message including said file name of said file containing said filtered data; and (h) said forwarding task group reading the filtered data from said file having said file name and forwarding the filtered data to said destination host, wherein each of said filtering rules comprises one of a plurality of file type values, each one of said plurality of file type values representing a respective type of message to be filtered, said message types comprising e-mail, extensible markup language (XML) messages and fixed-format messages, and wherein each of said filtering rules further comprises one of a plurality of action type values, each one of said plurality of action type values representing a respective type of action to be taken, said action types comprising checking that a value in a message field equals a value identified in the filtering rule being applied, checking that a value in a message field falls within a range of values identified in the filtering rule being applied, and checking that a value in a message field equals one of a list of values identified in the filtering rule being applied.

2. The method as recited in claim 1, wherein said filtering step comprises checking for a presence of dirty words in text fields of said message.

3. The method as recited in claim 1, wherein said filtering step comprises stripping out a field of said message.

4. The method as recited in claim 1, wherein said filtering step comprises zeroing a field of said message.

5. The method as recited in claim 1, further comprising the step of downgrading a sensitivity level of said message.

6. The method as recited in claim 1, further comprising the step of upgrading a sensitivity level of said message.

7. The method as recited in claim 1, wherein said filtering step comprises replacing a field of said message.

8. A secure network server system for transferring data between networks operating at different security levels, said data being a stream of messages, each message comprising a set of fields of transmitted data to be filtered, said secure network server system being programmed to perform the following steps:

(a) establishing a Transmission Control Protocol (TCP) session in response to initiation of a connection of a source host to said secure network server, said source host having a first security level, and said establishing a TCP session comprising creating a receiving task group, creating a forwarding task group and creating a generic filtering task group;

(b) providing a filter file that specifies filtering rules for a port number for an interface with a destination host, said destination host having a second security level different than said first security level;

(c) establishing a connection between said forwarding task group and said destination host that allows said forwarding task group to send messages to said destination host;

(d) establishing a connection between said receiving task group and said source host that allows said receiving task group to receive a message transmitted by said source host;

(e) said receiving task group storing said message received from said source host in a file having a file name and then forwarding said file name to said filtering task group;

(f) said filtering task group receiving said filtering rules from said filter file during initialization, reading data of said message stored in said file having said file name, validating that said read data matches a preset order and content values of said filtering rules, and filtering the content of said read data in accordance with said filtering rules;

(g) after the steps recited in (f) have been completed, said filtering task group sending a message to said forwarding task group, said message including said file name of said file containing said filtered data; and (h) said forwarding task group reading the filtered data from said file having said file name and forwarding the filtered data to said destination host, wherein each of said filtering rules comprises one of a plurality of file type values, each one of said plurality of file type values representing a respective type of message to be filtered, said message types comprising e-mail, extensible markup language (XML) messages and fixed-format messages, and wherein each of said filtering rules further comprises one of a plurality of action type values, each one of said plurality of action type values representing a respective type of action to be taken, said action types comprising checking that a value in a message field equals a value identified in the filtering rule being applied, checking that a value in a message field falls within a range of values identified in the filtering rule being applied, and checking that a value in a message field equals one of a list of values identified in the filtering rule being applied.

* * * * *